(12) United States Patent
Imajo et al.

(10) Patent No.: US 8,534,859 B2  
(45) Date of Patent: Sep. 17, 2013

(54) LIQUID CRYSTAL DISPLAY DEVICE AND TELEVISION SET

(75) Inventors: Ikuko Imajo, Mobara (JP); Masashi Baba, Chiba (JP); Sachiko Yamazaki, Mobara (JP)

(73) Assignees: Hitachi Displays, Ltd., Chiba (JP); Panasonic Liquid Crystal Display Co., Ltd., Hyogo (JP)

( * ) Notice: Subject to any disclaimer, the term of this patent is extended or adjusted under 35 U.S.C. 154(b) by 93 days.

(21) Appl. No.: 13/173,044

(22) Filed: Jun. 30, 2011

(65) Prior Publication Data
US 2012/0002118 A1    Jan. 5, 2012

(30) Foreign Application Priority Data
Jun. 30, 2010 (JP) ................................ 2010-150421

(51) Int. Cl.
G09F 13/04 (2006.01)
G09F 13/08 (2006.01)

(52) U.S. Cl.
USPC ....................................................... 362/97.3

(58) Field of Classification Search
USPC .............................................. 362/97.1–97.4
See application file for complete search history.

(56) References Cited

U.S. PATENT DOCUMENTS

| 8,075,150 B2 | 12/2011 | Maruyama |
| 2009/0021932 A1 | 1/2009 | Kim et al. |
| 2009/0168399 A1 | 7/2009 | Kim et al. |
| 2011/0026241 A1 | 2/2011 | Kim et al. |

FOREIGN PATENT DOCUMENTS

| JP | 2006-302581 | 11/2006 |
| JP | 2006-313684 | 11/2006 |
| JP | 2007-317423 | 12/2007 |
| JP | 2008-053062 | 3/2008 |
| JP | 2008-166304 A | 7/2008 |
| JP | 2008-170729 | 7/2008 |
| JP | 2008-198460 | 8/2008 |
| JP | 2009-26765 | 2/2009 |

OTHER PUBLICATIONS

Japanese Office Action for Application No. 2012-522619 dated Jul. 9, 2013.

*Primary Examiner* — Jason Moon Han
(74) *Attorney, Agent, or Firm* — Antonelli, Terry, Stout & Kraus, LLP.

(57) ABSTRACT

Provided is a liquid crystal display device, including: a liquid crystal panel having a display region; and a backlight unit disposed below the liquid crystal panel, in which: the backlight unit includes: at least one mounting substrate on which light emitting diodes are mounted; a radiator plate; and a reflection member; the reflection member has a reflection surface which is formed to have a recess surface shape; the light emitting diodes on the at least one mounting substrate are disposed on a bottom portion of the reflection surface; the at least one mounting substrate is disposed at a position under the bottom portion; the radiator plate is disposed under the at least one mounting substrate; and the radiator plate has, in plan view, a larger area than the at least one mounting substrate and a smaller area than the display region.

12 Claims, 10 Drawing Sheets

LIQUID CRYSTAL DISPLAY DEVICE AND TELEVISION SET

CROSS-REFERENCE TO RELATED APPLICATION

The present application claims priority from Japanese application JP 2010-150421 filed on Jun. 30, 2010, the content of which is hereby incorporated by reference into this application.

BACKGROUND OF THE INVENTION

1. Field of the Invention

The present invention relates to a liquid crystal display device and a television set including the liquid crystal display device.

2. Description of the Related Art

A backlight unit of a liquid crystal display device, which uses light emitting diode (LED) elements (hereinafter, also referred to as "light emitting diodes"), has come into commercial use. For example, there is known a direct type backlight unit, in which a plurality of LED elements are disposed directly below a liquid crystal panel.

Note that, in Japanese Patent Application Laid-open No. 2006-302581, disclosure is made about achieving a uniform temperature distribution across an entire surface of a display panel by effectively dissipating heat generated in a light emitting diode unit. Japanese Patent Application Laid-open No. 2008-53062 discloses a liquid crystal display device including a backlight unit, which is capable of uniformly and stably irradiating a liquid crystal panel with illumination light across the entire surface by uniformizing the temperature of LED elements with a simple structure. Further, in Japanese Patent Application Laid-open No. 2009-26765, disclosure is made about reducing the size and thickness of the backlight unit by integrally forming an LED module, an optical sheet or a reflection sheet provided to sandwich the LED module from above, and a heat radiating pad provided to sandwich the LED module from below.

SUMMARY OF THE INVENTION

Here, in order to reduce the cost of members of the direct type liquid crystal display device, it may be considered effective to dispose a reflection member having a reflection surface in a recess surface shape below the liquid crystal panel, and collectively dispose a plurality of LED elements on a bottom portion thereof. By using such a reflection member, it is possible to reduce the number of the LED elements compared with the case where the LED elements are arranged across the entire rear surface of the display region.

However, in the case where the number of the LED elements is reduced as described above, in order to achieve brightness of the backlight unit required for the liquid crystal display device, it is necessary to cause each of the LED elements to emit light at high intensity by supplying large power to each of the LED elements. Further, in the case described above, the LED elements emitting light at high intensity are collectively disposed, and hence heat generation larger than the conventional case locally occurs.

The present invention has an object to provide a liquid crystal display device and a television set including the liquid crystal display device, which are capable of effectively dissipating heat generated by a plurality of LED elements disposed on a bottom portion of a reflection member having a reflection surface in a recess surface shape.

(1) A liquid crystal display device according to the present invention includes: a liquid crystal panel having a display region at which an image is displayed; and a backlight unit disposed below the liquid crystal panel, in which: the backlight unit includes: at least one mounting substrate on which a plurality of light emitting diodes are mounted; a radiator plate; and a reflection member; the reflection member has a reflection surface which is formed to have a recess surface shape below the liquid crystal panel; the plurality of light emitting diodes on the at least one mounting substrate are disposed on a bottom portion of the reflection surface which is formed to have the recess surface shape; the at least one mounting substrate is disposed at a position on an outer side of the reflection surface in the recess surface shape and under the bottom portion; the radiator plate is disposed under the at least one mounting substrate; and the radiator plate has, in plan view, a larger area than the at least one mounting substrate and a smaller area than the display region of the liquid crystal panel.

(2) The liquid crystal display device as described in Item (1) of the present invention may further include a casing for covering the radiator plate and the reflection member from outer sides thereof, and the radiator plate may be attached to the casing under a state in which a bottom surface of the radiator plate is brought into contact with the casing.

(3) In the liquid crystal display device as described in Item (1) of the present invention: the bottom portion of the reflection surface may be formed flat so that the reflection member is brought into contact with a top surface of the at least one mounting substrate; the reflection surface which is formed to have the recess surface shape may have inclined surfaces formed continuously with the bottom portion; and the radiator plate may overlap a part of the inclined surfaces in plan view.

(4) In the liquid crystal display device as described in Item (3) of the present invention, the radiator plate may have a larger area than the bottom portion in plan view, to thereby overlap the part of the inclined surfaces.

(5) In the liquid crystal display device as described in Item (1) or (2) of the present invention: the at least one mounting substrate may include a plurality of mounting substrates; any two mounting substrates of the plurality of mounting substrates may be disposed with an interval provided therebetween; and the radiator plate may have a hollow through hole formed between the any two mounting substrates disposed with the interval provided therebetween.

(6) In the liquid crystal display device as described in Item (5) of the present invention: each of the any two mounting substrates may have a linear shape; and the hollow through hole may be formed in a groove shape between the any two mounting substrates.

(7) In the liquid crystal display device as described in Item (5) of the present invention: each of the any two mounting substrates may have a linear shape along a long-side direction of the liquid crystal panel; and the hollow through hole may be formed in a groove shape along the long-side direction of the liquid crystal panel.

(8) In the liquid crystal display device as described in Item (5) of the present invention: each of the any two mounting substrates may have a linear shape; at least one of the any two mounting substrates may have a first mounting portion and a second mounting portion on which the plurality of light emitting diodes are mounted in a higher density than in the first mounting portion; and the hollow through hole may be formed in a groove shape along the second mounting portion.

(9) In the liquid crystal display device as described in Item (7) of the present invention: the any two mounting substrates may be linearly arranged; one of the any two mounting substrates may be disposed in a manner offset to one side in the long-side direction; another of the any two mounting substrates may be disposed in a manner offset to another side in the long-side direction; and the hollow through hole may be formed in a groove shape between portions opposed to each other of the any two mounting substrates.

(10) In the liquid crystal display device as described in Item (8) of the present invention, the second mounting portion may be disposed at a position closer to a center of the liquid crystal panel in the long-side direction than the first mounting portion.

(11) In the liquid crystal display device as described in Item (2) of the present invention, the casing and the radiator plate may be formed flat in portions contacting to each other.

(12) In the liquid crystal display device as described in Item (11) of the present invention: the casing may have a through hole in the portion contacting to the bottom surface of the radiator plate; the radiator plate may have a screw hole in the portion contacting to the casing; and the radiator plate may be fixed to the casing by inserting a screw into the screw hole of the radiator plate via the through hole of the casing.

(13) A television set according to the present invention includes the liquid crystal display device as described in any one of Items (1) to (12) of the present invention, the television set being formed so as to receive a radio wave for television broadcast to display an image and output sound.

According to the liquid crystal display device and the television set of the present invention, heat is effectively dissipated, the heat being generated by the plurality of LED elements disposed on the bottom portion of the reflection member having the reflection surface in the recess surface shape.

DETAILED DESCRIPTION OF THE INVENTION

Hereinafter, embodiments of the present invention are described with reference to the drawings.

First Embodiment

Figure 1:
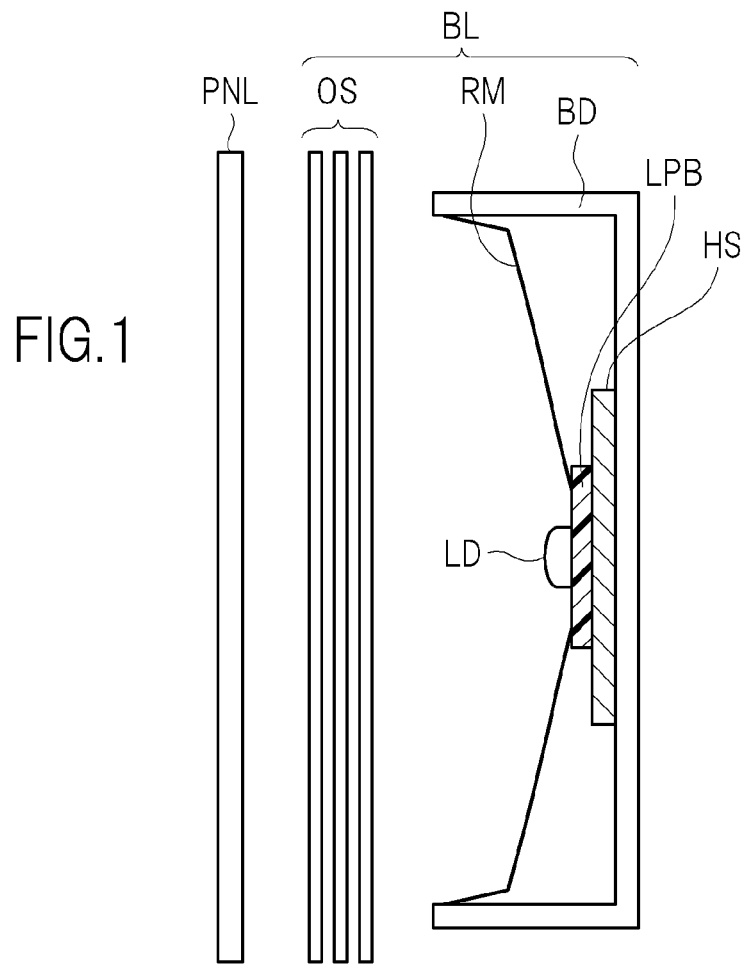
FIG. 1 is a schematic view illustrating a state of a cross section of a liquid crystal display device according to a first embodiment of the present invention.
Figure 2:
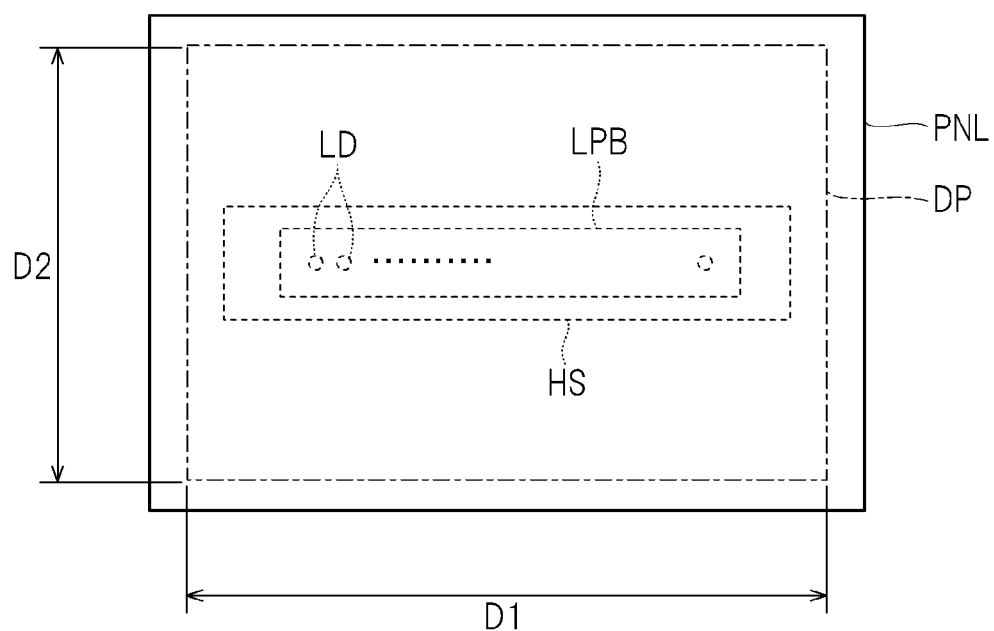
FIG. 2 is a schematic view illustrating a state of the liquid crystal display device according to the first embodiment when viewed from above.

FIG. 1 is a schematic view illustrating a state of a cross section of a liquid crystal display device according to a first embodiment of the present invention. FIG. 2 is a schematic view of the liquid crystal display device according to the first embodiment of the present invention when viewed from above (side on which an image is displayed).

As illustrated in FIG. 1, the liquid crystal display device according to the first embodiment includes a liquid crystal panel PNL and a backlight unit BL.

The liquid crystal panel PNL includes a thin film transistor (TFT) substrate which is a glass substrate on which thin film transistors are formed in matrix, a counter substrate which is provided opposed to the TFT substrate, and a liquid crystal layer sandwiched therebetween. Further, the liquid crystal panel PNL includes an upper polarizing plate and a lower polarizing plate which are disposed so that transmission axes thereof are orthogonal to each other.

Light emitted from the backlight unit toward the liquid crystal panel PNL is polarized when the light passes through the lower polarizing plate to become linearly polarized light. In each pixel, the polarization direction of the linearly polarized light is controlled in accordance with the crystal state of the liquid crystal layer. The linearly polarized light passes through the upper polarizing plate or is blocked depending on the polarization state. Further, as illustrated in FIG. 2, the liquid crystal panel PNL has a display region DP at which an image is displayed. In the display region DP, a plurality of pixels are arranged in matrix, and the crystal state of the liquid crystal layer is controlled in each of the pixels, to thereby display an image.

The backlight unit BL is disposed below the liquid crystal panel PNL (in right side direction of FIG. 1), and includes a mounting substrate LPB on which a plurality of light emitting diodes LD are mounted, a radiator plate HS, a reflection member RM, a casing BD, and an optical sheet OS.

The reflection member RM of this embodiment is formed of a reflection sheet. As illustrated in FIG. 1, the reflection member RM has a reflection surface on the liquid crystal panel PNL side in a recess surface shape, and the plurality of light emitting diodes LD are disposed on a bottom portion of the reflection surface, the bottom portion being disposed in the center of the display region DP. In the reflection surface of the reflection member RM of this embodiment, the bottom portion is formed flat, and inclined surfaces are formed continuously with the flat bottom portion. In this manner, the reflection surface is formed to have a recess surface shape. This reflection member RM is described in detail later.

The mounting substrate LPB is a substrate made of a glass epoxy resin or the like, and mounts the plurality of light emitting diodes LD serving as light sources. The plurality of light emitting diodes LD emit light by being supplied with a signal or power from the mounting substrate. Light emitted from the light emitting diodes LD is radiated to the optical sheet OS directly or via the reflection surface of the reflection member RM, and then provided to the liquid crystal panel PNL. As illustrated in FIG. 1, the mounting substrate LPB is disposed at a position on the outer side of the reflection surface in the recess surface shape, and under the bottom portion on which the light emitting diodes LD are disposed.

The radiator plate HS is formed of a member having large heat conductivity, such as an aluminum or copper member. In this embodiment, the radiator plate HS is a member for fixing the mounting substrate LPB, and is disposed under the mounting substrate LPB. The mounting substrate LPB is fixedly placed on the top side of the radiator plate HS by a screw or the like with a heat conduction sheet or the like sandwiched therebetween. Further, as illustrated in FIG. 2, the radiator plate HS is formed to be larger than the mounting substrate LPB and smaller than the display region DP.

As illustrated in FIG. 1, the casing BD is a box-shaped member made of a metal, which is disposed on the outer sides of the reflection member RM and the radiator plate HS to protect the reflection member RM and the radiator plate HS. In this embodiment, the radiator plate HS is formed in a flat plate shape, and a bottom surface thereof is attached in contact to the casing BD. In this manner, the heat transmitted from the radiator plate HS can be further dissipated to the outside.

The optical sheet OS is an optical sheet such as a diffusion sheet and a prism sheet, and a plurality of the optical sheets OS are disposed between the liquid crystal panel PNL and the reflection member RM.

In the above, the respective members of the liquid crystal display device according to this embodiment are described. Hereinafter, positional relationships among the radiator plate HS, the mounting substrate LPB, and the display region DP according to this embodiment in plan view are described in detail.

First, as illustrated in FIG. 2, when viewed in plan from the side of the liquid crystal panel PNL where the image is displayed, the radiator plate HS is formed to have a larger area than the mounting substrate LPB and have a smaller area than the display region DP. Further, as illustrated in FIG. 2, the radiator plate HS and the mounting substrate LPB each have a rectangular planar shape. A long-side direction of the radiator plate HS is the same as a long-side direction D1 of the liquid crystal panel PNL. Further, the radiator plate HS and the mounting substrate LPB are disposed in the center of the display region DP, and are disposed along a central line in a short-side direction D2 of the liquid crystal panel PNL while overlapping the central line. Further, the plurality of light emitting diodes LD are linearly arranged at equal pitches in the long-side direction D1. It is desired that the plurality of light emitting diodes LD be disposed to be bilaterally symmetric with respect to a central line in the long-side direction D1 of the display region DP.

Figure 3:
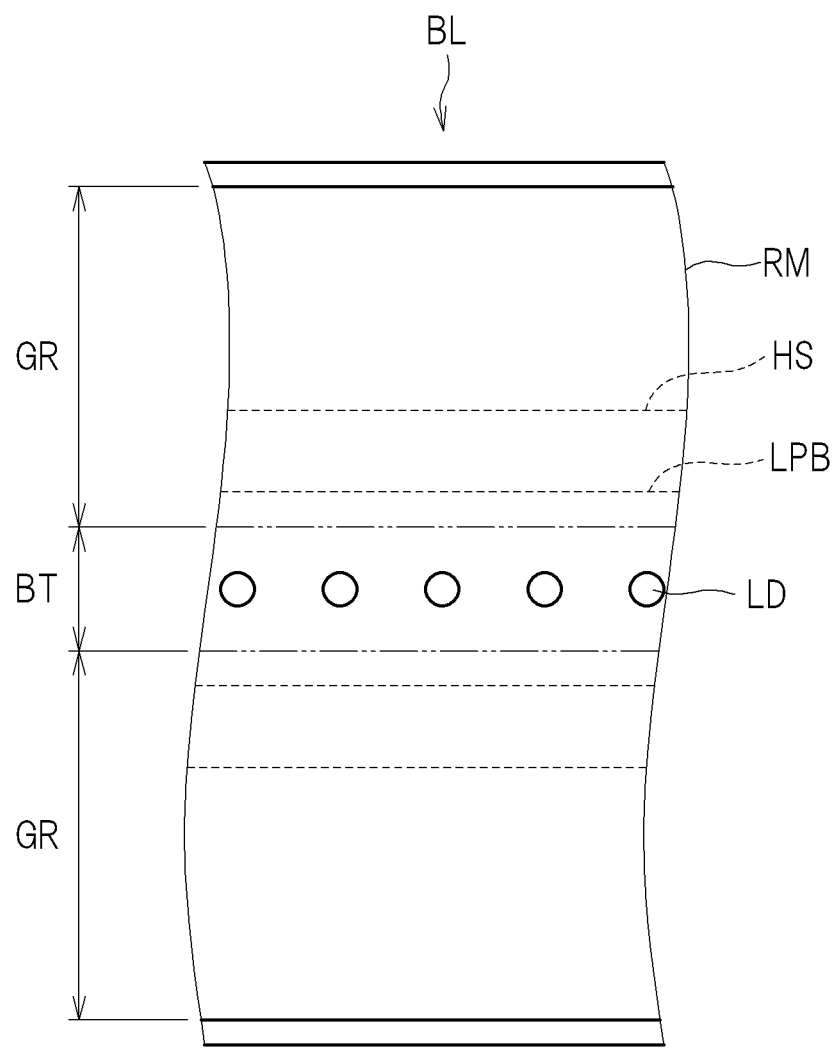
FIG. 3 is a schematic view illustrating a state of a part of a backlight unit according to the first embodiment when viewed from above.

Next, FIG. 3 is a schematic view illustrating a state of a part of the backlight unit BL according to this embodiment when viewed from a top surface side thereof. The reflection surface of the reflection member RM includes a bottom portion BT and inclined surfaces GR. In the bottom portion BT, a plurality of holes are formed so as to dispose the light emitting diodes LD on the inner side thereof. Further, the plurality of holes are formed to be linearly arranged in a manner corresponding to the arrangement of the light emitting diodes LD on the mounting substrate LPB. Note that, the inclined surfaces GR may be curved, or may be inclined surfaces having a constant inclined angle.

As illustrated in FIGS. 1 and 3, the bottom portion BT of the reflection surface in the recess surface shape is formed flat because the reflection sheet is brought into contact with the top surface of the mounting substrate LPB. Further, the inclined surfaces GR extend, as illustrated in FIG. 3, in the up-and-down direction of FIG. 3 so as to be continuous with the bottom portion BT. In the reflection sheet, respective light emitting diodes LD are inserted through the plurality of holes to be positioned on the inner side of the reflection surface, and the reflection sheet is folded at boundaries between the bottom portion BT and the inclined surfaces GR. Thus, the reflection sheet is fixed in a manner that the bottom portion BT is adhered to a part of the top surface of the mounting substrate LPB. Further, as illustrated in FIG. 3, the radiator plate HS has a larger area than the bottom portion BT in plan view. Further, in this embodiment, the bottom portion BT is disposed on the inner side of the radiator plate HS so that, in plan view, the outer circumference of the bottom portion BT is surrounded by the outer circumference of the radiator plate HS. Note that, in FIG. 3, the state of the bottom portion BT in the long-side direction D1 is not illustrated, but also in the long-side direction D1, inclined surfaces which are different from the inclined surfaces GR may be formed so as to be continuous with the bottom portion BT.

Figure 4:
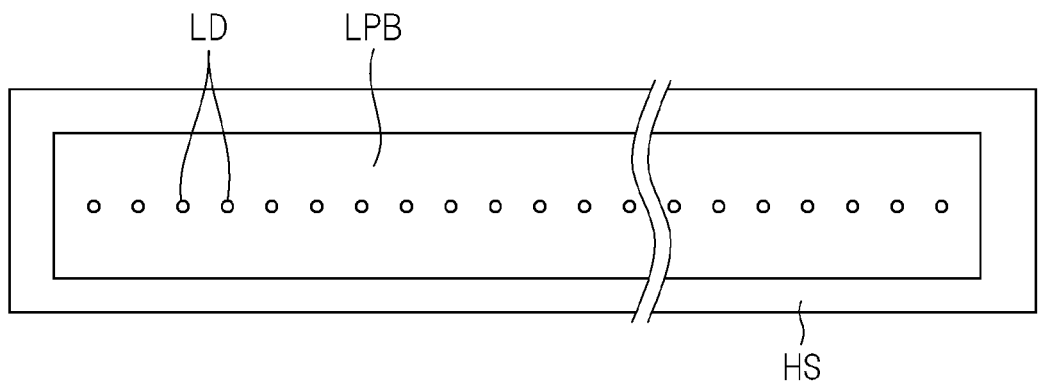
FIG. 4 is a schematic top view illustrating a radiator plate and a mounting substrate according to the first embodiment.

FIG. 4 is a schematic top view illustrating the radiator plate HS and the mounting substrate LPB according to this embodiment. The mounting substrate LPB is disposed on the inner side of the radiator plate HS when viewed in plan from the liquid crystal panel PNL side. The outline forming the outer circumference of the radiator plate HS surrounds the outer side of the mounting substrate LPB. In other words, it may be said that the outer circumference of the radiator plate HS surrounds the outer circumference of the mounting substrate LPB. By forming the radiator plate HS to be larger in area than the mounting substrate LPB, heat generated in the mounting substrate LPB is effectively dissipated. Further, by forming the radiator plate HS to be smaller in area than the display region DP, the member cost of the radiator plate HS itself may be reduced.

In this embodiment, power supplied to each of the light emitting diodes LD is as large as about 3 to 4 times power supplied to each of the LED elements in the case of the conventional direct type liquid crystal display device (specifically, in the case where the LED elements are arranged all over in matrix below the display region DP). Further, at the bottom portion BT, the light emitting diodes LD which emit light at such high intensity are collected, and hence the radiator plate HS is extended to a space which is on the rear side of the inclined surfaces GR continuous with the flat bottom portion BT.

That is, in the liquid crystal display device according to this embodiment, with respect to the problem that large local heat generation occurs by disposing the plurality of light emitting diodes LD on the bottom portion BT, by focusing attention on the space having a margin on the rear side of the inclined surfaces GR of the reflection surface in the recess surface shape, the radiator plate HS is extended so as to overlap parts of the inclined surfaces GR, to thereby improve the efficiency of dissipation.

Further, the radiator plate HS is made of a metal having higher heat conductivity than the casing BD and is formed thicker than the thickness of the casing BD. The casing BD and the radiator plate HS are formed to be flat in portions brought into contact with each other. Further, the casing BD has a through hole in the portion contacting to the bottom surface of the radiator plate HS, and the radiator plate HS also has a screw hole in the portion contacting to the casing. A screw is inserted into the screw hole via the through hole of the casing BD, to thereby attach the radiator plate HS to the casing BD. In this embodiment, as illustrated in FIG. 1, the radiator plate HS is formed in a flat plate shape, and the entire bottom surface of the radiator plate HS is attached in contact to the portion of the casing BD formed in parallel to the liquid crystal panel PNL.

Note that, in this embodiment, the reflection member RM is formed of a reflection sheet. However, for example, a reflection film coating may be performed on the mounting substrate LPB so that the reflection member RM is formed to include the reflection film coating and the reflection sheet. In this case, with the reflection film coating, the bottom portion BT of the reflection surface in the recess surface shape is formed, and with the reflection sheet, the inclined surfaces GR of the reflection surface in the recess surface shape are formed. The reflection film coating is formed in contact on the top surface of the mounting substrate LPB.

Note that, in this embodiment, in plan view, the radiator plate HS is disposed on the inner side of the display region DP, and the mounting substrate LPB is disposed on the inner side of the radiator plate HS. The radiator plate HS and the mounting substrate LPB are preferred to be disposed as described above, but, for example, the radiator plate HS and the mounting substrate LPB may be extended in the long-side direction D1 so as to be partially disposed on the outer side of the display region DP, as long as the area of the radiator plate HS is larger than the area of the mounting substrate LPB and smaller than the area of the display region DP. Further, the area of the radiator plate HS is desired to be about one-ninth the area of the display region DP or larger and one-third the area of the display region DP or smaller.

Second Embodiment

Figure 5:
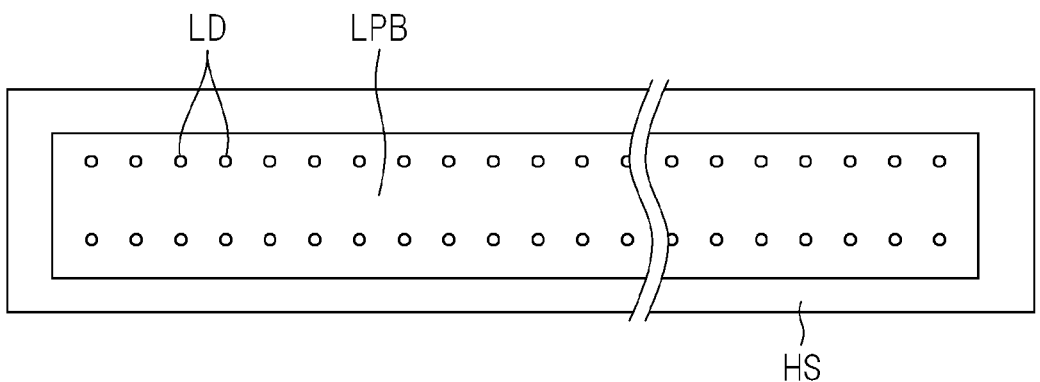
FIG. 5 is a schematic top view illustrating a radiator plate and a mounting substrate according to a second embodiment of the present invention.

Next, a liquid crystal display device according to a second embodiment of the present invention is described. In the liquid crystal display device according to the second embodiment, as illustrated in FIG. 5, on one mounting substrate LPB fixed on the radiator plate HS, the light emitting diodes LD are mounted in two rows. Further, for this reason, also in the bottom portion BT of the reflection surface, the light emitting diodes LD are arranged in two rows. Structures other than the points described above of the liquid crystal display device according to the second embodiment are substantially the same as those of the liquid crystal display device according to the first embodiment.

In this embodiment, the light emitting diodes LD are arranged in two rows, and hence compared with the case of the first embodiment, it is possible to reduce the power to be supplied to each of the light emitting diodes LD. On the other hand, in view of designing the reflection surface in a recess surface shape, the light emitting diodes LD are desired to be arranged in one row as in the first embodiment, and the first embodiment can perform uniform irradiation of light with respect to the liquid crystal panel PNL with more ease.

Note that, in this embodiment, the light emitting diodes LD are mounted in two rows on one mounting substrate LPB, but the light emitting diodes LD may be mounted in three rows, or may be mounted in a staggered pattern. Also in those cases, similarly to the case of the first embodiment, the radiator plate HS is formed to have a larger area than the mounting substrate LPB and a smaller area than the display region DP, and hence efficiency of dissipation may be improved.

Third Embodiment

Figure 6:
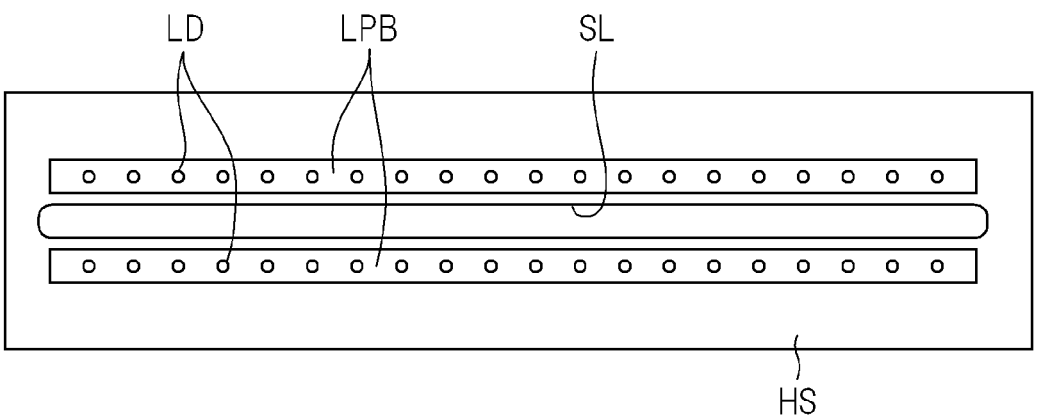
FIG. 6 is a schematic top view illustrating a radiator plate and mounting substrates according to a third embodiment of the present invention.

Next, a liquid crystal display device according to a third embodiment of the present invention is described. In the liquid crystal display device according to the third embodiment, as illustrated in FIG. 6, two mounting substrates LPB are fixed on the radiator plate HS. Further, on each of the two mounting substrates LPB, the light emitting diodes LD are linearly mounted in one row. For this reason, on the bottom portion BT of the reflection surface, the light emitting diodes LD are arranged in two rows. Further, the radiator plate HS has a slit SL serving as a through hole between portions of the radiator plate HS on which the two mounting substrates LPB are disposed. The slit SL of this embodiment is a hollow through hole formed in a groove shape in the long-side direction D1 along the mounting substrates LPB. Structures other than the points described above of the liquid crystal display device according to the third embodiment are substantially the same as those of the liquid crystal display device according to the first embodiment.

Figure 7:
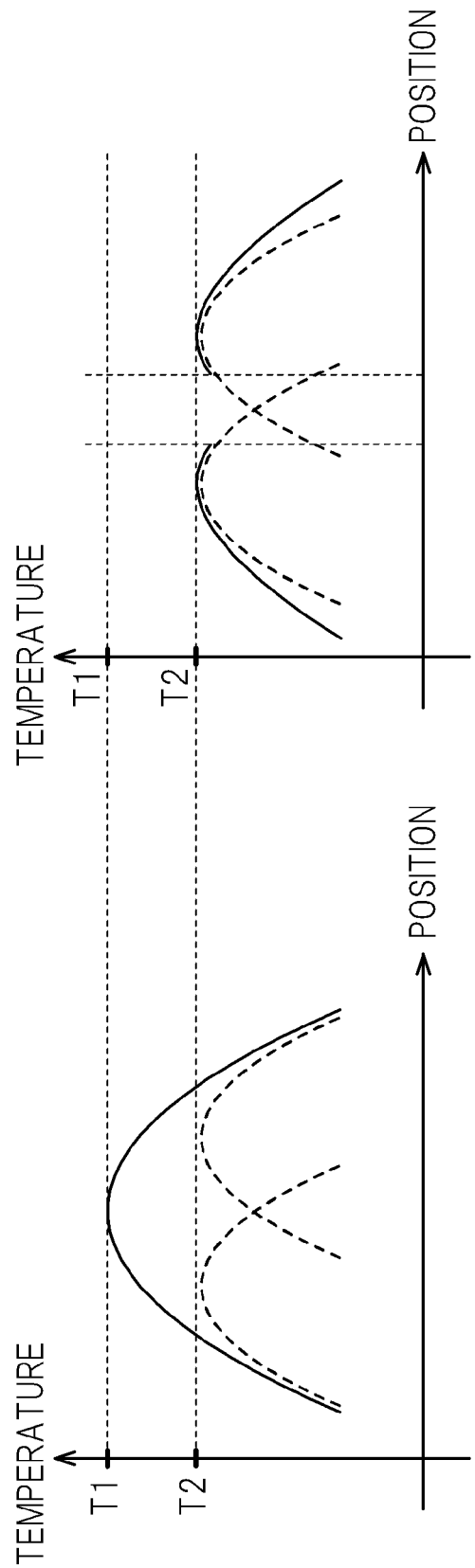
FIG. 7 illustrates graphs of temperature distributions of the radiator plates of the second and third embodiments, respectively.

FIG. 7 illustrates graphs of temperature distributions in the short-side direction D2 of the radiator plates HS in the cases of the second and third embodiments, respectively. In each of the two graphs of FIG. 7, the horizontal axis indicates the position of the radiator plate HS in the short-side direction, and the vertical axis indicates temperature.

In both of the second and third embodiments, the light emitting diodes LD are arranged in two rows on the bottom portion BT. The graph in the solid line on the left side of FIG. 7 indicates the case of the second embodiment, and the graph in the solid lines on the right side of FIG. 7 indicates the case of the third embodiment. Further, the broken lines in the graphs on the right and left sides of FIG. 7 indicate the temperature distribution of a virtual case where the light emitting diodes LD are arranged in one row. The graph in the solid line indicating the temperature distribution of the case of the second embodiment (left side of FIG. 7) corresponds to an integral of the two graphs in the broken lines, and has a high temperature (T1) state at the center of the radiator plate HS. On the other hand, the graph in the solid lines indicating the temperature distribution of the case of the third embodiment (right side of FIG. 7) lacks the temperature distribution at the position corresponding to the slit SL, and hence there is obtained a temperature distribution which is similar to the temperature distribution in a case where the one-row light emitting diodes LD are separately disposed.

That is, in this embodiment, compared with the case where the slit SL is absent, the temperature of heat generated in the radiator plate HS may be prevented from being locally high, and uniform temperature distribution may be obtained in the liquid crystal display device.

Note that, as illustrated in FIG. 6, the radiator plate HS has a ring shape in plan view. That is, the radiator plate HS has two long-side portions extending in the long-side direction and two short-side portions extending in the short-side direction so as to connect the two long-side portions. The slit SL is obtained by being surrounded by those portions. Further, the two mounting substrates LPB are respectively disposed on the top sides of the two long-side portions. By forming the radiator plate HS in such a ring shape including the slit SL, for example, even in a case where the light emitting diode LD is deteriorated to cause different heat generation in part, uniform temperature distribution may be obtained as a whole radiator plate HS, and thus the reliability improves.

Fourth Embodiment

Figure 8:
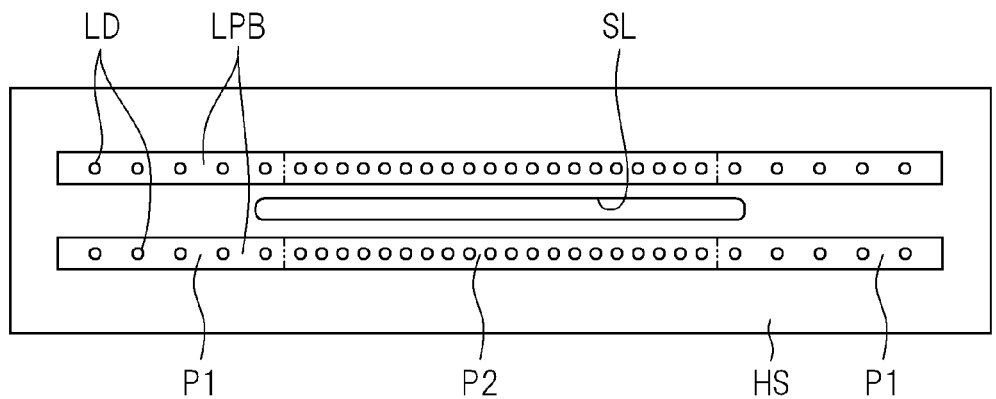
FIG. 8 is a schematic top view illustrating a radiator plate and mounting substrates according to a fourth embodiment of the present invention.

Next, a liquid crystal display device according to a fourth embodiment of the present invention is described. In the liquid crystal display device according to the fourth embodiment, similarly to the case of the third embodiment, the slit SL is formed between the two mounting substrates LPB fixed on the radiator plate HS. However, in the case of the fourth embodiment, as illustrated in FIG. 8, the light emitting diodes LD are arranged in different density on each of the mounting substrates LPB.

Specifically, each of the mounting substrates LPB has first mounting portions P1 on which the light emitting diodes LD are arranged at predetermined pitches, and a second mounting portion P2 on which the light emitting diodes LD are arranged at pitches smaller than the predetermined pitches to have a higher density than in the first mounting portions P1. The second mounting portion P2 is disposed at a position closer to the center than the first mounting portions P1. Further, in particular, in this embodiment, the slit SL is linearly formed along the second mounting portions P2. As illustrated in FIG. 8, the slit SL is interposed between the two second mounting portions P2 provided opposed to each other. In a region between the two first mounting portions P1 provided opposed to each other, there are a portion where the slit SL exists and a portion where the slit SL is absent. Structures other than the points described above of the liquid crystal display device according to the fourth embodiment are substantially the same as those of the liquid crystal display device according to the third embodiment.

Note that, in this embodiment, the light emitting diodes LD are arranged in different density in both of the two mounting substrates LPB, but the light emitting diodes LD may be arranged in different density only in one of the mounting substrates LPB. By forming the slit SL along the second mounting portions P2 where large heat generation occurs, the local increase in temperature distribution of the radiator plate HS may be suppressed.

Fifth Embodiment

Next, a liquid crystal display device according to a fifth embodiment of the present invention is described. In the liquid crystal display device according to the fifth embodiment, similarly to the case of the fourth embodiment, the light emitting diodes LD are arranged in different density on each of the mounting substrates LPB and the slit SL is formed between the two mounting substrates LPB. However, the fifth embodiment is different from the case of the fourth embodiment in that the two mounting substrates LPB are disposed while being displaced in the long-side direction D1. Structures other than the point described above of the liquid crystal display device according to the fifth embodiment are substantially the same as those of the liquid crystal display device according to the fourth embodiment.

Figure 9:
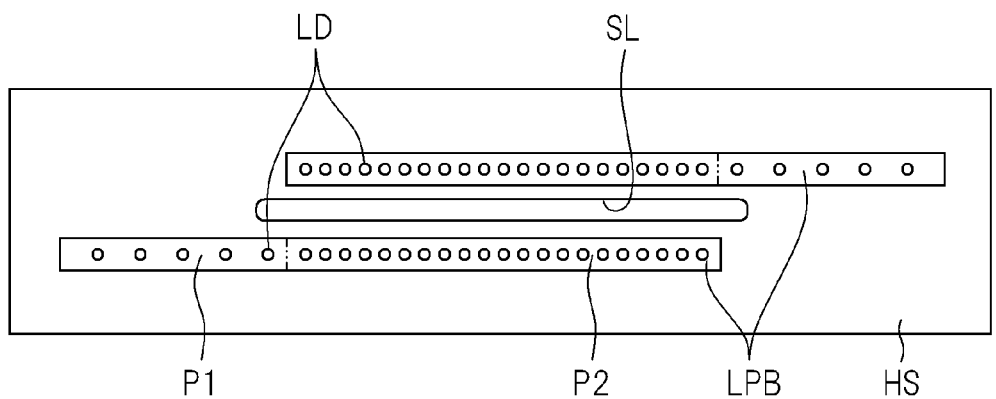
FIG. 9 is a schematic top view illustrating a radiator plate and mounting substrates according to a fifth embodiment of the present invention.

As illustrated in FIG. 9, one of the mounting substrates LPB is disposed in a manner offset to the right side of FIG. 9, and the other of the mounting substrates LPB is disposed in a manner offset to the left side of FIG. 9. The slit SL is formed between the portions opposed to each other of the mounting substrates LPB. Further, in this embodiment, each of the mounting substrates LPB has one first mounting portion P1 and one second mounting portion P2. The slit SL is formed between the two second mounting portions P2 and parts of the slit SL are extended along the first mounting portions P1. Note that, in FIG. 9, the first mounting portion P1 of the one mounting substrate LPB is not provided opposed to the other mounting substrate LPB, but may be opposed to the second mounting portion P2 of the other mounting substrate LPB by further extending the first mounting portion P1 of the one mounting substrate LPB to the central side of the liquid crystal panel PNL.

Sixth Embodiment

Figure 10:
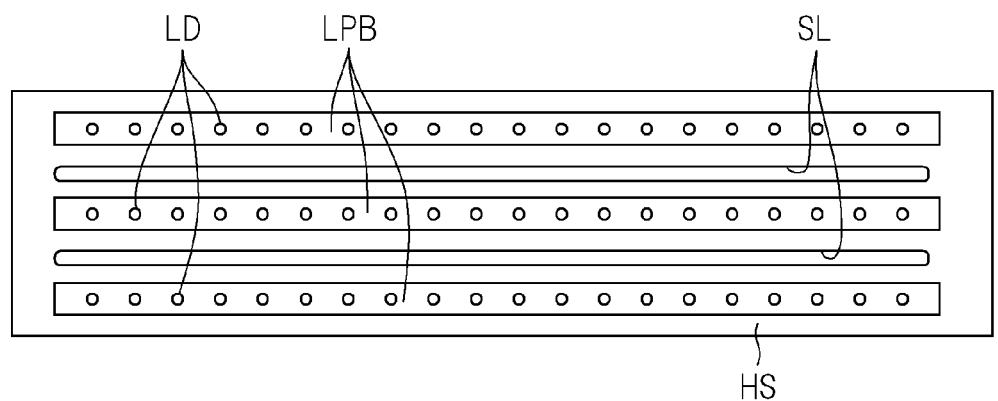
FIG. 10 is a schematic top view illustrating a radiator plate and mounting substrates according to a sixth embodiment of the present invention.

Next, a liquid crystal display device according to a sixth embodiment of the present invention is described. FIG. 10 is a schematic top view illustrating the radiator plate HS and the mounting substrates LPB according to the sixth embodiment of the present invention. In the liquid crystal display device of the sixth embodiment, the number of the mounting substrates LPB and the number of the slits SL are different from those in the case of the third embodiment. Structures other than the points described above of the liquid crystal display device according to the sixth embodiment are substantially the same as those of the case of the third embodiment. As illustrated in FIG. 10, the area of the radiator plate HS is formed to be larger than the sum of the areas of the plurality of mounting substrates LPB.

Figure 11:
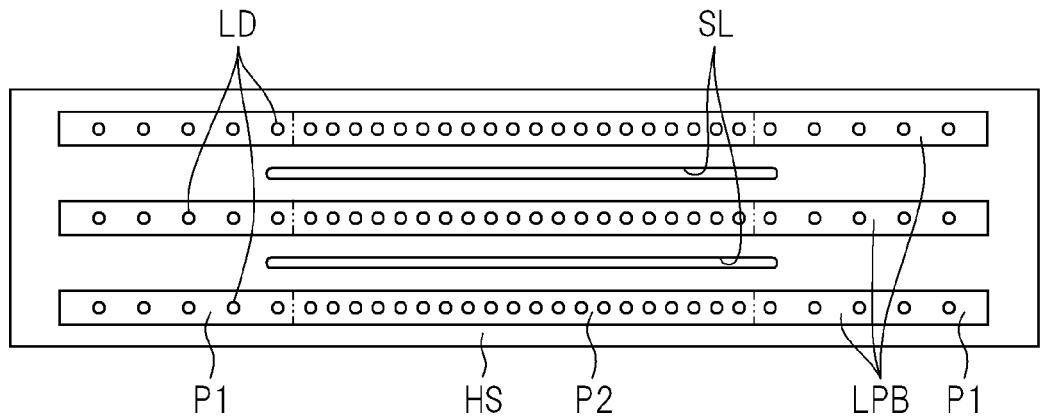
FIG. 11 is a schematic top view illustrating a radiator plate and mounting substrates according to a modified example of the sixth embodiment.

Further, FIG. 11 is a schematic top view illustrating the radiator plate HS and the mounting substrates LPB according to a modified example of the sixth embodiment. In this modified example, the three mounting substrates LPB each have the first mounting portions P1 on which the light emitting diodes LD are arranged at predetermined pitches, and the second mounting portion P2 on which the light emitting diodes LD are arranged at pitches smaller than the predetermined pitches to have a higher density than in the first mounting portions P1. Further, the slits SL are linearly formed in the long-side direction D1 along the second mounting portions P2.

Note that, in the third to sixth embodiments, a plurality of mounting substrates LPB of two or three are disposed on the radiator plate HS, but a plurality of mounting substrates LPB of four or more may be disposed thereon. Further, for example, in the sixth embodiment, three mounting substrates LPB and two slits SL are formed, but one slit SL may be formed between any two mounting substrates LPB among the three mounting substrates LPB.

Note that, in each of the embodiments described above, the mounting substrate LPB has a linear shape (rectangular shape elongated in one direction). However, for example, the mounting substrate LPB may have other shapes such as a square shape, and a plurality of square mounting substrates LPB may be disposed on the radiator plate HS and a hollow through hole may be formed therebetween.

Seventh Embodiment

Figure 12:
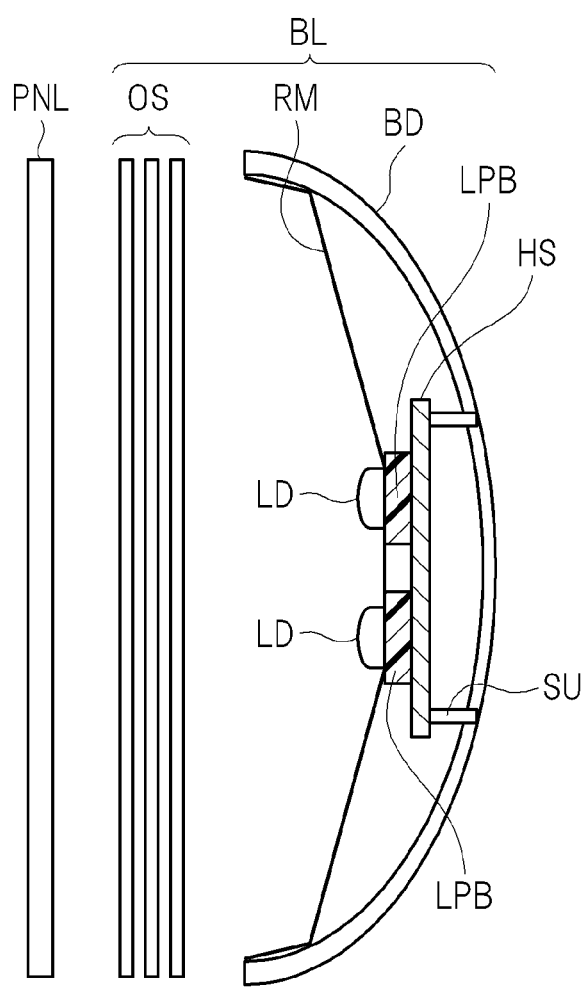
FIG. 12 is a schematic view illustrating a state of a cross section of a liquid crystal display device according to a seventh embodiment of the present invention.

Next, a liquid crystal display device according to a seventh embodiment of the present invention is described. FIG. 12 is a schematic view illustrating a state of a cross section of the liquid crystal display device according to the seventh embodiment. As illustrated in FIG. 12, in the seventh embodiment, two mounting substrates LPB are disposed on the radiator plate HS, and the light emitting diodes LD are arranged in two rows on the bottom portion BT of the reflection surface. Further, the radiator plate HS is fixed to the casing BD by a support member SU. The casing BD of the backlight unit BL has a cross section in a curved shape. Structures other than the points described above of the liquid crystal display device according to the seventh embodiment are substantially the same as those in the case of the first embodiment, and hence description of the similar portions is omitted.

In this embodiment, as illustrated in FIG. 12, the bottom portion BT of the reflection surface is formed flat. Specifically, the bottom portion BT of the reflection surface is formed flat because the reflection sheet is brought into contact with the top surfaces of the two mounting substrates LPB. The reflection surface is flat also between the two mounting substrates LPB.

Note that, in each of the embodiments described above, the casing BD is a casing for the backlight unit BL, and the casing BD is included in the liquid crystal display device. However, the casing BD does not need to be a casing for protecting only the backlight unit BL, and, for example, may be a casing for the entire liquid crystal display device, which fixes the liquid crystal panel PNL and the like. Note that, in the embodiments described above, the casing BD is desired to be made of a metal. However, the casing BD may be made of other materials, for example, a resin in the case of the casing BD of the seventh embodiment.

Further, the present invention may be applied to an in-plane switching (IPS) type liquid crystal display device, and it is needless to say that the present invention may also be applied to liquid crystal display devices of other types, such as vertical alignment (VA) type and twisted nematic (TN) type liquid crystal display devices.

Further, by incorporating the liquid crystal display device described in anyone of the embodiments described above, a television set can be formed, which receives radio waves for television broadcast to display images and output sound. Hereinafter, a liquid crystal television set is described as an example.

Eighth Embodiment

Figure 13:
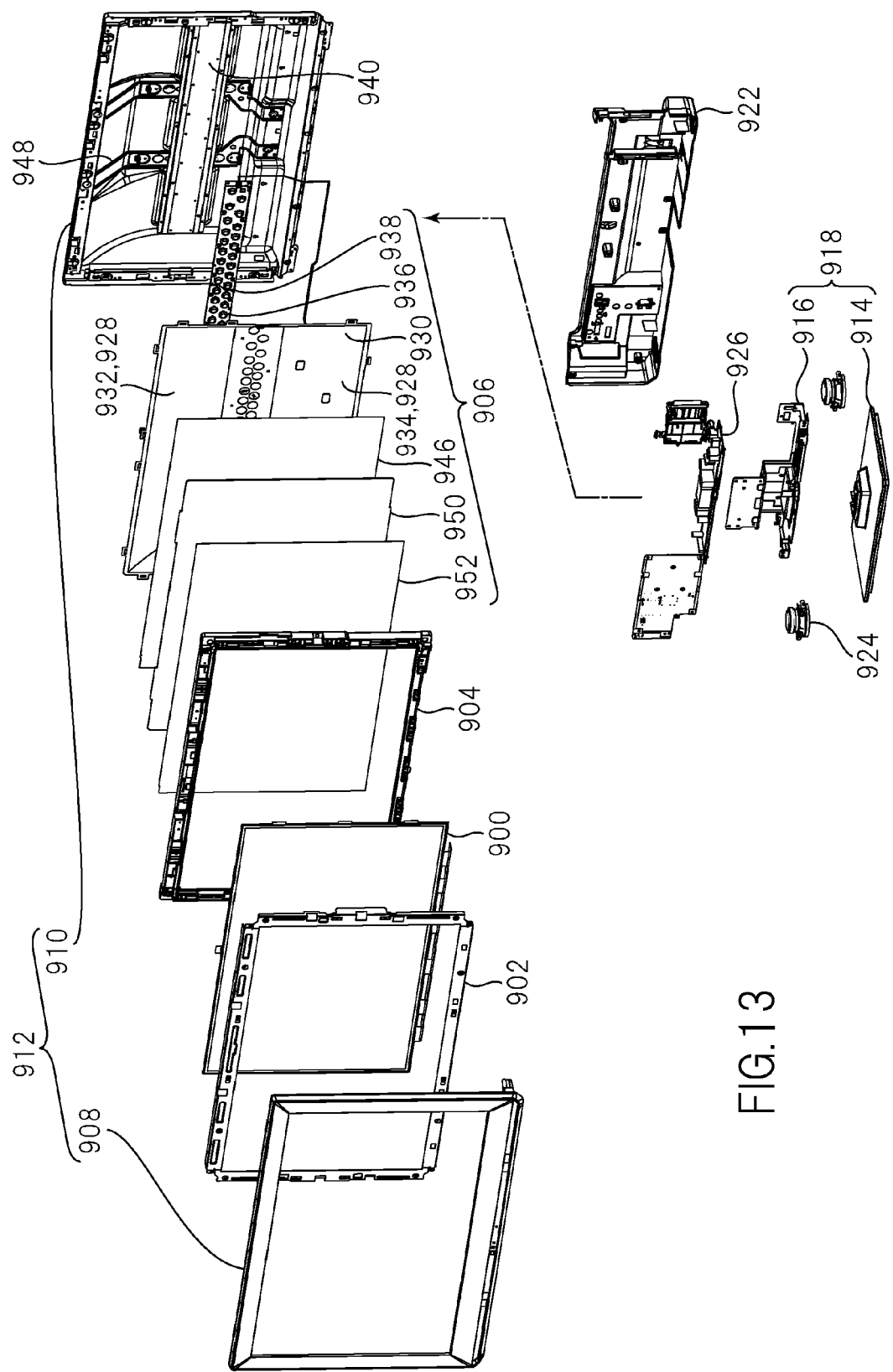
FIG. 13 is an exploded perspective view of a liquid crystal television set according to an eighth embodiment of the present invention.
Figure 14:
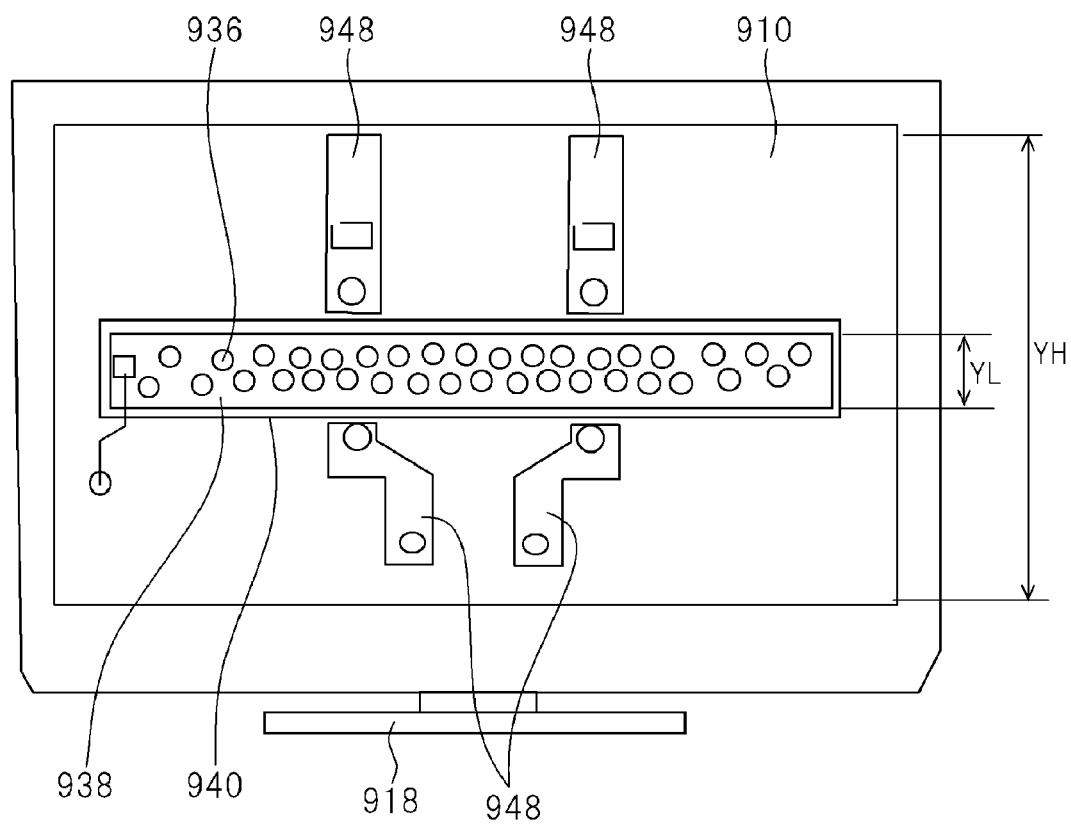
FIG. 14 is a top view illustrating members provided behind a reflection sheet of the liquid crystal television set illustrated in FIG. 13.
Figure 15:
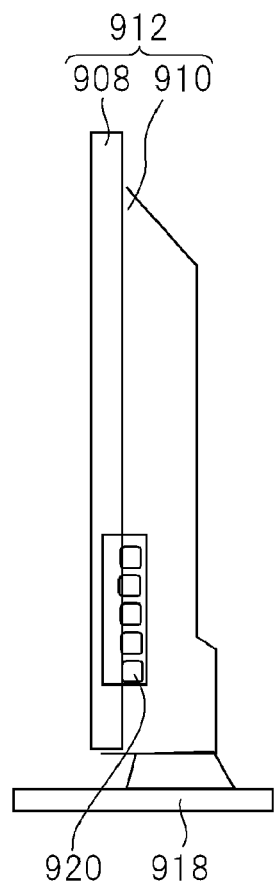
FIG. 15 is a side view of the liquid crystal television set illustrated in FIG. 13.
Figure 16:
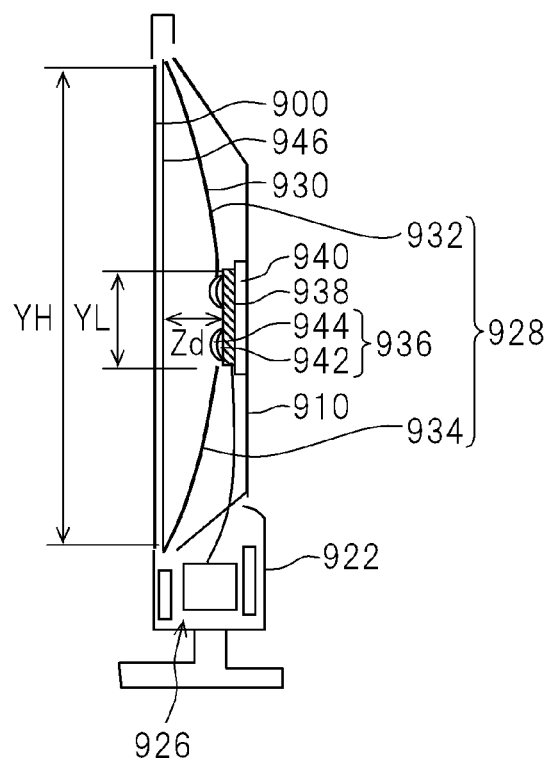
FIG. 16 is a schematic view of a vertical cross section of the liquid crystal television set illustrated in FIG. 13.

FIG. 13 is an exploded perspective view of a liquid crystal television set according to an eighth embodiment of the present invention. FIG. 14 is a top view illustrating members provided behind a reflection sheet of the liquid crystal television set illustrated in FIG. 13. FIG. 15 is a side view of the liquid crystal television set illustrated in FIG. 13. FIG. 16 is a schematic view of a vertical cross section of the liquid crystal television set illustrated in FIG. 13.

The liquid crystal television set includes a liquid crystal panel 900 having a horizontally long screen. The screen of the liquid crystal television set has an aspect ratio (ratio of horizontal dimension to vertical dimension) of 16:9. The liquid crystal panel 900 has a front side (side on which an image is displayed) supported by an upper frame 902, and a rear side supported by a mold frame 904. The liquid crystal television set includes a backlight unit 906, which is overlapped by the liquid crystal panel 900.

The liquid crystal panel 900, the upper frame 902, the mold frame 904, and the backlight unit 906 are stored in a cabinet 912 (a casing) including a front cabinet 908 and a back cabinet 910. The front cabinet 908 is made of a resin, and the back cabinet 910 is made of iron subjected to coating. The cabinet 912 is supported by a stand 918 including a pedestal 914 and a leg 916. As illustrated in FIG. 15, on the side surface of the cabinet 912, switches 920 are provided.

A cover 922 is attached to a lower rear part of the back cabinet 910. A speaker 924 and a circuit board 926 are disposed inside the cover 922. The circuit board 926 includes a tuned circuit (tuner) for selecting a radio wave having a specific frequency from radio waves having various frequencies.

The backlight unit 906 includes a reflection sheet 930 having a curved portion 928 so that a recess surface thereof faces the liquid crystal panel 900. The curved portion 928 of the reflection sheet 930 is disposed so as to be separated from the cabinet 912 (see FIG. 16). The curved portion 928 includes a first curved portion 932 and a second curved portion 934. The first curved portion 932 and the second curved portion 934 are formed on respective sides of the reflection sheet 930 in a vertical direction of the screen while sandwiching a plurality of light emitting diodes 936. The circuit board 926 is disposed on a lower side of a space between the curved portion 928 and the back cabinet 910 (see FIG. 16).

The backlight unit 906 includes a mounting substrate 938 on which the reflection sheet 930 is overlapped on a side opposite to the liquid crystal panel 900 of the reflection sheet 930. A width of the mounting substrate 938 in the vertical direction of the screen is half the length of the screen in the vertical direction or less. The mounting substrate 938 is fixed to a radiator plate 940, and the radiator plate 940 is fixed to the cabinet 912.

In this embodiment, at a position roughly corresponding to a center of the screen, the light emitting diodes 936 including point light sources 942 (see FIG. 16) are mounted on the rectangular mounting substrate 938, which is long in the horizontal direction. A printed-wiring board may be used as the mounting substrate 938. Fixation of the mounting substrate 938 is performed by threadably mounting the mounting substrate 938 on the radiator plate 940 made of a metal such as aluminum and then threadably mounting the radiator plate 940 on the back cabinet 910. In this embodiment, the light emitting diodes 936 are arranged in a staggered pattern and in two rows in the up-and-down direction, so as to extend in the horizontal direction. When seen from the front side, a dimension YL of the mounting substrate 938 is set so as to be one-third a height YH of the screen of the liquid crystal panel 900 or less.

The backlight unit 906 includes the plurality of light emitting diodes 936, which are mounted on the mounting substrate 938 and disposed so as to protrude to the recess surface side of the curved portion 928 while passing through the reflection sheet 930. The plurality of light emitting diodes 936 may be arranged in at least one row in the horizontal direction of the screen, and are desired to be arranged so as to be stored within a space region, which has a width in the vertical direction of the region at which the plurality of light emitting diodes 936 are disposed, the width being half the length of the screen in the vertical direction or less. Each of the light emitting diodes 936 includes, as illustrated in FIG. 16, the point light source 942 and a lens 944 disposed on the outer side thereof. On the mounting substrate 938, the lenses 944 each made using an acrylic resin are mounted so as to respectively cover the point light sources 942.

Figure 17:
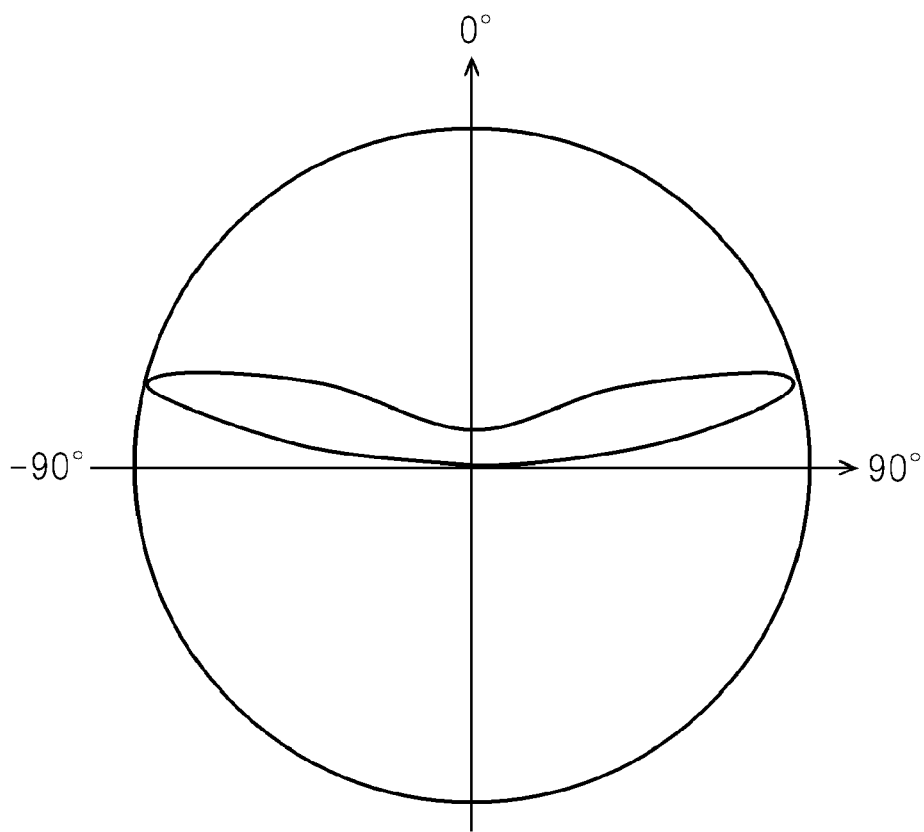
FIG. 17 is a graph illustrating a light intensity distribution of a light emitting diode included in the liquid crystal television set of the eighth embodiment.
Figure 18:
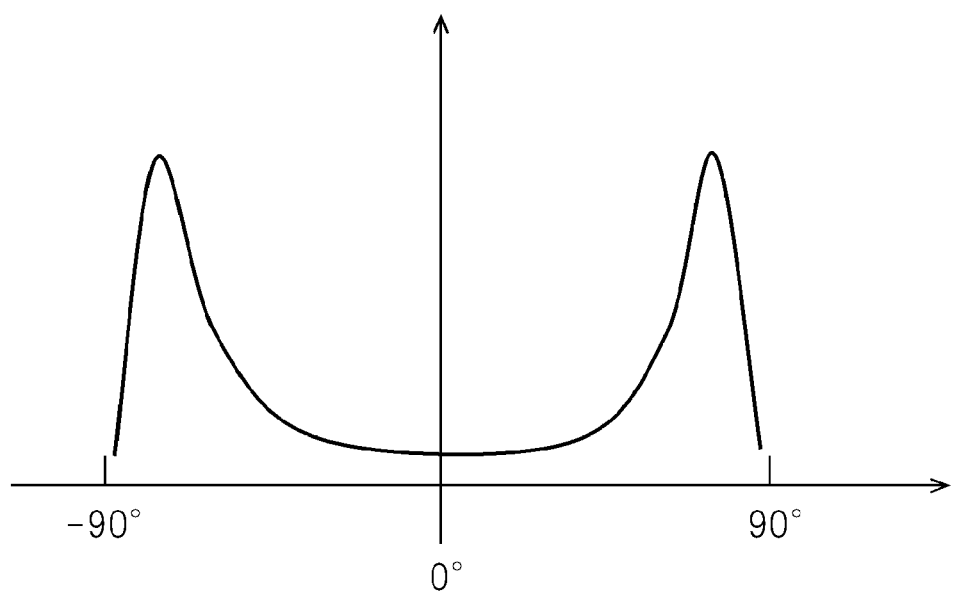
FIG. 18 is a graph illustrating a measurement result of intensity of light emitted from a lens of the light emitting diode included in the liquid crystal television set of the eighth embodiment.

The light emitting diode 936 emits light in a perpendicular direction to the mounting substrate 938 and in other directions, and light emitted in other directions is higher in intensity than light emitted in the perpendicular direction. The lens 944 has a wide light distribution characteristic, which causes the light emitted from the point light source 942 to be more spread out in a viewing angle direction than in a front side direction. Such a light intensity distribution (directivity characteristic) of the light emitting diode 936 is illustrated in FIG. 17. Further, FIG. 18 is a graph illustrating a measurement result of intensity of light which exits from the lens 944. Note that, angle values represent angles formed between a normal to the mounting substrate 938 and a light emission direction.

The liquid crystal television set of the eighth embodiment has high image quality performance, which provides an impression that, although the vertical dimension YL of the mounting substrate 938 is reduced to be one-third the vertical dimension YH of the screen or less, the screen is bright and high brightness uniformity is provided across the entire screen.

In this embodiment, the sum of the vertical dimensions of the pair of lenses 944 which are most separated in the vertical direction and the dimension between the pair of lenses 944 is one-third the screen dimension YH or less. Further, in a case where the light emitting diodes 936 are arranged in one row in the horizontal direction, a width (diameter) of the lens 944 in the vertical direction is one-third the screen dimension YH or less. In order to reduce cost, the point light source 942 and the lens 944 are formed in dimensions not to extend off the mounting substrate 938, and the dimensions thereof are set to the minimum.

In this embodiment, the vertical dimension YL of the mounting substrate 938, or the width in the vertical direction of the region at which the lenses 944 are arranged in two rows in the vertical direction (the sum of the vertical dimensions of the pair of lenses 944 and the vertical dimension of the interval therebetween) is one-third the vertical dimension of the screen or less. Therefore, even if the number of the light emitting diodes 936 is reduced, the screen is bright and a natural and smooth brightness distribution is obtained. Therefore, the cost may be greatly reduced.

In this embodiment, the curved portion 928 of the reflection sheet 930 is disposed so as to have a width of a length obtained by subtracting the vertical dimension YL of the mounting substrate 938 from the dimension YH in the vertical direction of the screen (short-side direction of the screen). When the width of the curved portion 928 is half the dimension YH or more, the brightness distribution of the screen is comfortable even when the screen is seen from the front side. Further, the number of light emitting diodes 936 may be significantly reduced, and hence the cost may be reduced. That is, the cost may be reduced by forming a region for reflection by the curved portion 928 to be larger than a region for a space where the light emitting diodes 936 are stored.

The light emitted from the point light source 942 disposed on the mounting substrate 938 is spread out by the lens 944, which is made of an acrylic resin and disposed above the point light source 942. The light thus spread out has a distribution characteristic that light intensity is larger in an oblique direction than in the front side direction. The lens 944 for wide light distribution is attached to each of the plurality of point light sources 942, and hence, in a space in a range from the mounting substrate 938 to a diffusion plate 946 provided in the perpendicular direction (direction to the screen) (hereinafter, referred to as inner thickness Zd), the light radiated to a peripheral direction of the screen from the mounting substrate 938 has higher light intensity than that of the light emitted to the front side. Part of the light which exits from the lens 944 to the front side passes through the diffusion plate 946, and then is used to display an image by the liquid crystal panel 900. The remaining part of the light is reflected by the diffusion plate 946, and then reflected by the reflection sheet 930, to thereby be radiated to a direction different from the front side direction. Part of light radiated to a periphery of the screen after passing through the lens 944 passes through a peripheral portion of the screen by the diffusion plate 946, and other part of the light is reflected by the reflection sheet 930 having the curved portion 928 and passes through the diffusion plate 946 again.

As for the brightness performance of the liquid crystal television set having the above-mentioned structure, when the brightness measured from the front side is 100%, the periphery thereof is in a dark state of about 30%. A ratio of the brightness at the center of the screen in the front side to the average brightness is 1.65. However, because the curved portion 928 of the reflection sheet 930 is smoothly curved, smooth brightness change is obtained from the mounting substrate 938 in the vertical direction of the screen. Therefore, even though the ratio of the central brightness to the average brightness is as large as 1.65, it is possible to provide a comfortable image because a large inflection point is absent in the distribution thereof.

The fact that a comfortable and smooth brightness distribution can be obtained even though the ratio of the central brightness to the average brightness is 1.65 or larger represents that, conversely, it is possible to reduce the number of the light emitting diodes 936 and narrow the width of the mounting substrate 938, to thereby reduce the cost.

Note that, it is impossible to achieve the characteristic that the brightness at the center is high and the brightness decreases with smooth brightness distribution toward the periphery of the screen when a structure which blocks light radiation to the front side is provided. In this case, the center is dark, which results in uncomfortable display distribution. Therefore, the light emission characteristic of each light emitting diode 936, which includes the point light source 942 and the lens 944 for capping the corresponding point light source 942, includes a predetermined output to the front side.

The back cabinet 910 forms the outermost surface of the liquid crystal television set. The mounting substrate 938 is threadably mounted on the radiator plate 940. By dissipating the heat from the light emitting diodes 936 by the mounting substrate 938 and the radiator plate 940, the junction temperature of the light emitting diode 936 is suppressed to a predetermined value.

The mounting substrate 938 and the reflection sheet 930 are fixed at positions near the back cabinet 910, and hence it is possible to achieve a thin liquid crystal television set. With this structure, the thickness of the liquid crystal television set may be reduced while maintaining the comfortable uniformity of the brightness performance.

In the conventional backlight unit structure, the substrate on which the light emitting diodes are mounted is fixed to a back frame (not shown) of the liquid crystal display device, which is made of iron or aluminum. On the outer portion of the back frame, there are disposed a power supply for driving the light emitting diodes and a substrate of a timing controller for controlling a gate signal line and a drain signal line of the liquid crystal panel. The back cabinet is disposed on a further outer portion thereof. Therefore, the television set requires, in addition to the inner thickness distance between the diffusion plate and the light emitting diode of the backlight unit, a distance provided between the back frame and the back cabinet, which causes the liquid crystal television set to be thick.

In this embodiment, light, which exits from the lens 944 with a higher brightness in the periphery than in the front side, passes through the predetermined space (inner thickness Zd), and then passes through the diffusion plate 946 and the liquid crystal panel 900. With this, an image is displayed. The mounting substrate 938 is brought into contact with the radiator plate 940, and the radiator plate 940 and the back cabinet 910 are fixed to each other by a screw, and hence a space distance other than the inner thickness Zd may be reduced. Therefore, the thickness of the liquid crystal television set may be reduced.

The reduction in thickness of the liquid crystal television set is achieved also by the disposition of the circuit board 926 including a power supply circuit, a video circuit, a tuned circuit (tuner), and a timing circuit for the liquid crystal panel 900. Specifically, the curved portion 928 of the reflection sheet 930 is curved in a direction separating from the back cabinet 910, and hence a large space can be obtained between the curved portion 928 and the back cabinet 910. In the lower portion of the liquid crystal television set, the circuit board 926 including the power supply circuit, the video circuit, the tuned circuit (tuner), and the timing circuit for the liquid crystal panel 900 is stored in a compact manner. With this, a space is reduced between the back cabinet 910 and the mounting substrate 938 on which the light emitting diodes 936 are mounted or the radiator plate 940.

Next, manufacturing steps of the liquid crystal television set are described with reference to FIG. 13. A wall-mount bracket 948 is attached to the back cabinet 910 from the inner side thereof, the back cabinet 910 being formed by subjecting a member made of an iron material to coating. The wall-mount bracket 948 reinforces the strength of the back cabinet 910. Screw receiving holes are formed in the wall-mount bracket 948, which are used when the liquid crystal television set is mounted on the wall from the rear side of the back cabinet 910. The radiator plate 940 is fixed to the inner side of the back cabinet 910, the radiator plate being made of an aluminum material.

Next, the mounting substrate 938 on which the point light sources 942 are mounted is attached to the radiator plate 940. On each of the point light sources 942, the acrylic lens 944 for wide light distribution is capped, and the lens 944 is fixed by an adhesive. Here, a white resist is applied onto the mounting substrate 938 so that light emitted from the point light sources 942 can easily perform successive reflection on the surface of the mounting substrate 938. Next, the reflection sheet 930 is attached, which has a surface with light diffusion property, is curved in the vertical direction of the screen, and has holes larger in diameter than the lens 944 so as to insert the lenses 944 therethrough. Above the reflection sheet 930, the diffusion plate 946, a prism sheet 950, and a diffusion sheet 952, each having a thickness of 1.5 mm to 3 mm, are disposed. In the space (inner thickness Zd) between the mounting substrate 938 and the rear surface of the diffusion plate 946, direct light from the point light sources 942 and reflected light, which is secondary light, from the reflection sheet 930 are combined.

Next, the optical sheet group is fixed by the mold frame 904, which is made of a resin material and divided in quarters. Above the mold frame 904, the liquid crystal panel 900 is disposed. The liquid crystal panel 900 includes two glass substrates and liquid crystal sealed therebetween. One substrate (TFT substrate) includes thin film transistors (TFTs), drain signal lines, and gate signal lines, and the other substrate includes a color filter. The gate signal lines and the drain signal lines formed on the TFT substrate are pulled outside to be connected to a driver IC and a drain substrate on which the driver IC is mounted. On each surface of the glass substrates, a polarizing plate is adhered. The drain substrate is electrically connected to the timing control circuit for supplying the video signal via a flexible cable. Above the liquid crystal panel 900, the upper frame 902 made of iron is attached, for blocking electromagnetic waves from the driver IC and fixing the liquid crystal panel 900.

In order to finally complete the liquid crystal television set, the front cabinet 908 made of a resin material is attached to the surface of the upper frame 902. On the lower side of the cabinet 912, a control circuit for the light emitting diodes 936, a timing control circuit, a power supply circuit for supplying power to the video circuit, a connection terminal to the outside, and the like are disposed, and the cover 922 for protection, which is made of a resin, is attached.

The present invention is not limited to the embodiments described above, and various modifications may be made thereto. Further, the respective embodiments may be combined as appropriate. For example, the structures described in the embodiments may be replaced by substantially the same structure, a structure having the same action and effect, and a structure which may achieve the same object.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A liquid crystal display device, comprising:
    a liquid crystal panel having a display region at which an image is displayed; and
    a backlight unit disposed below the liquid crystal panel, wherein:
    the backlight unit comprises:
        at least one mounting substrate on which a plurality of light emitting diodes are mounted;
        a radiator plate; and
        a reflection member;
    the reflection member has a reflection surface which is formed to have a recess surface shape below the liquid crystal panel;
    the plurality of light emitting diodes on the at least one mounting substrate are disposed on a bottom portion of the reflection surface which is formed to have the recess surface shape;
    the at least one mounting substrate is disposed at a position on an outer side of the reflection surface in the recess surface shape and under the bottom portion;
    the at least one mounting substrate comprises a plurality of mounting substrates;
    any two mounting substrates of the plurality of mounting substrates are disposed with an interval provided therebetween;
    the radiator plate has a hollow through hole formed between the any two mounting substrates disposed with the interval provided therebetween;
    the radiator plate is disposed under the at least one mounting substrate; and
    the radiator plate has, in plan view, a larger area than the at least one mounting substrate and a smaller area than the display region of the liquid crystal panel.

2. The liquid crystal display device according to claim 1, further comprising a casing for covering the radiator plate and the reflection member from outer sides thereof,
    wherein the radiator plate is attached to the casing under a state in which a bottom surface of the radiator plate is brought into contact with the casing.

3. The liquid crystal display device according to claim 1, wherein:

the bottom portion of the reflection surface is formed flat so that the reflection member is brought into contact with a top surface of the at least one mounting substrate;

the reflection surface which is formed to have the recess surface shape has inclined surfaces formed continuously with the bottom portion; and the radiator plate overlaps a part of the inclined surfaces in plan view.

4. The liquid crystal display device according to claim 3, wherein the radiator plate has a larger area than the bottom portion in plan view, to thereby overlap the part of the inclined surfaces.

5. The liquid crystal display device according to claim 1, wherein:

each of the any two mounting substrates has a linear shape; and the hollow through hole is formed in a groove shape between the any two mounting substrates.

6. The liquid crystal display device according to claim 1, wherein:

each of the any two mounting substrates has a linear shape along a long-side direction of the liquid crystal panel; and the hollow through hole is formed in a groove shape along the long-side direction of the liquid crystal panel.

7. The liquid crystal display device according to claim 1, wherein:

each of the any two mounting substrates has a linear shape;

at least one of the any two mounting substrates has a first mounting portion and a second mounting portion on which the plurality of light emitting diodes are mounted in a higher density than in the first mounting portion; and the hollow through hole is formed in a groove shape along the second mounting portion.

8. The liquid crystal display device according to claim 6, wherein:

the any two mounting substrates are linearly arranged;

one of the any two mounting substrates is disposed in a manner offset to one side in the long-side direction;

another of the any two mounting substrates is disposed in a manner offset to another side in the long-side direction; and the hollow through hole is formed in a groove shape between portions opposed to each other of the any two mounting substrates.

9. The liquid crystal display device according to claim 7, wherein the second mounting portion is disposed at a position closer to a center of the liquid crystal panel in the long-side direction than the first mounting portion.

10. The liquid crystal display device according to claim 2, wherein the casing and the radiator plate are formed flat in portions contacting to each other.

11. The liquid crystal display device according to claim 10, wherein:

the casing has a through hole in the portion contacting to the bottom surface of the radiator plate;

the radiator plate has a screw hole in the portion contacting to the casing; and the radiator plate is fixed to the casing by inserting a screw into the screw hole of the radiator plate via the through hole of the casing.

12. A television set, comprising the liquid crystal display device according to claim 1, the television set being formed so as to receive a radio wave for television broadcast to display an image and output sound.

* * * * *